(12) United States Patent
Lehtola

(10) Patent No.: US 7,864,107 B1
(45) Date of Patent: Jan. 4, 2011

(54) RF RECEIVER SENSING BY HARMONIC GENERATION

(75) Inventor: Gary E. Lehtola, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/483,444

(22) Filed: Jun. 12, 2009

Related U.S. Application Data

(63) Continuation-in-part of application No. 11/192,792, filed on Jul. 30, 2005, now abandoned.

(51) Int. Cl.
G01S 7/41 (2006.01)
(52) U.S. Cl. .................................. 342/146; 342/193
(58) Field of Classification Search .................. 342/146
See application file for complete search history.

(56) References Cited

U.S. PATENT DOCUMENTS

| | | | |
|---|---|---|---|
| 3,781,879 | A | 12/1973 | Staras |
| 4,053,891 | A | 10/1977 | Optiz |
| 4,384,281 | A | 5/1983 | Cooper |
| 5,191,343 | A | 3/1993 | Danzer |
| 5,668,342 | A | 9/1997 | Discher |
| 6,057,765 | A | 5/2000 | Jones |
| 6,163,259 | A | 12/2000 | Barsumian |
| 6,765,527 | B2 | 7/2004 | Jablonski |
| 6,897,777 | B2 | 5/2005 | Holmes |
| 7,464,005 | B1 * | 12/2008 | Beetner et al. ............ 702/189 |
| 7,639,178 | B1 * | 12/2009 | Mulbrook et al. ......... 342/146 |
| 2003/0179126 | A1 | 9/2003 | Jablonski |
| 2004/0095243 | A1 | 5/2004 | Holmes |
| 2006/0144170 | A1 | 7/2006 | Stephen |
| 2009/0006024 | A1 | 1/2009 | Seguin |
| 2009/0009380 | A1 * | 1/2009 | Schnitzer et al. .......... 342/90 |

OTHER PUBLICATIONS http://www.I-vision.ca/home.html—"Welcome to I-Vision Systems Technology"—Home Page For I-Visions Technology, Mississauga, Ontario Canada Jul. 27, 2005 (1 Page).
http://www.I-vision.ca/home.html—"Contact"—Contact Page For I-Visions Technology Jul. 27, 2005 (1 Page).

(Continued)

Primary Examiner—Thomas H Tarcza
Assistant Examiner—Matthew M Barker
(74) Attorney, Agent, or Firm—Matthew J. Evans; Daniel M. Barbieri

(57) ABSTRACT

The system includes a transmitter, at least one detection system receiver, a modulated signal source, and a directional receive antenna. The transmitter emits a high power illuminating signal at a receive frequency of a target RF receiver to be detected. The high power illuminating signal is sufficient to cause the target RF receiver to generate harmonic emissions. At least one detection system receiver is used for detecting at least one harmonic frequency emitted by the target RF receiver. The modulated signal source is operatively associated with the transmitter to modulate the illuminating signal and for use as a reference to the detection system receiver such that the turn around time of the harmonic frequency emitted by the target RF receiver can be measured. A directional receive antenna is operatively associated with the detection system receiver for determining the angle to the target RF receiver.

15 Claims, 3 Drawing Sheets

OTHER PUBLICATIONS http://www.I-vision.ca/specials.html—"Law Enforcement and Government"—Device Listings For I-Visions Technology Jul. 27, 2005 (2 Pages—The Second Page is Blank).

Popup From http://www.I-vision.ca/specials.html—Military/Law Enforcement Field Non-Linear Junction Detector-ISV-07—Jul. 27, 2005 (4 Pages).

* cited by examiner

RF RECEIVER SENSING BY HARMONIC GENERATION

CROSS REFERENCE TO RELATED APPLICATIONS

This is a continuation-in-part of U.S. Ser. No. 11/192,792, entitled "RF Receiver Sensing By Harmonic Generation", filed Jul. 30, 2005.

BACKGROUND OF THE INVENTION

1. Field of the Invention

The present invention relates to is directed to systems for detecting the presence of non-linear junctions such as are found in devices that contain semiconductors and more particularly to a detecting and locating system for use in revealing hidden RF receivers at a distance, particularly Improvised Explosive Devices (IED's).

2. Description of the Related Art

A variety of methods are presently being used for detonating IED's. These include command detonated devices; remote controlled devices such as battery powered doorbell devices, pagers, cell phones, etc.

Use of non-linear junction detectors (NLJD's) for detecting the presence of IED's is known. The operational principle of the non-linear junction detector (NLJD) is based on the effect of non-linear signal transudation inside objects containing semi-conducting components. Devices containing semi-conducting components react to high frequency signals transmitted by non-linear NLJD and re-radiate energy back on doubled and tripled frequencies of the original flooding signal. Electronic components return more second harmonic of the flooding signal and oxidized metal items and metal-to-metal contacts return more third harmonic. Using non-linear NLJD for the detection and analysis of the second harmonic of the flooding signals allows identification of explosive devices containing electronic components and third harmonic detection and analysis provides possibilities to find weapons and arms including concealed caches.

Various companies have devices that exploit this technology. For example, I-Vision Systems Technology, Mississauga, Ontario CANADA sells a device, marketed as Military/Law Enforcement Field Non-Linear Junction Detector-ISV-07, which is designed to detect mines and improvised explosive devices within explosive ordinance disposal (E.O.D.) and counter terrorist applications. This device is deployed by bomb squads to detect explosive devices containing electronic components such as: Special remote control; receivers; transceivers; electronic fuses; electronic timers and delayed-action units; engineering mines; and, hidden arms caches.

U.S. Pat. No. 6,057,765, issued to T. H. Jones, et al., entitled "Non-Linear Junction Detector," discloses a non-linear junction detector designed for counter surveillance measures by using a single circularly polarized antenna to transmit a signal and to receive harmonics of the transmitted signal that are re-radiated by a non-linear junction such as would be found in a eavesdropping device containing a semiconductor. The antenna is mounted on a telescoping antenna extension assembly. A single electrically conductive cable is contained inside the antenna and connects the antenna to the transceiver case which houses the non-linear junction detector electronics. A cable winder is built into the antenna and is employed to provide automatic dispensing and retraction of the cable when the antenna extension assembly is extended or retracted. A display is built into the antenna head assembly to provide signal strength indications and operational information concerning the functioning of the non-linear junction detector to the user of the device. The control signals and power for the display are multiplexed onto the single electrically conductive cable.

U.S. Pat. No. 6,897,777, issued to S. J. Holmes, et al., also entitled, "Non-Linear Junction Detector," discloses the illumination of a target junction with energy at a fundamental RF frequency. Reflections from the non-linear junction are analyzed to determine the type of junction detected. The power output level of a transmitter emitting the illuminating signal is automatically controlled so as to drive the signal strength of the received signals towards a predetermined value, e.g. a minimum threshold value. An indication of the current received signal strength, adjusted by a factor so as to compensate for any automatic adaptation in the actual transmitter power output level, may be provided to an operator.

Generally, prior art in this field is centered around detection of nonlinear junctions by proximity to the transmit/receive antenna rather than standing off and locating the receiver to be detected in distance and angle measurements. A fixed frequency is used and no effort is taken to take advantage of a threat receiver's antenna and RF front end as an entry point for the transmitted signal used to saturate the receiver to be detected.

SUMMARY OF THE INVENTION

In a broad aspect, the present invention is a radio frequency (RF) receiver detection and locating system that includes a transmitter, at least one detection system receiver, a modulated signal source, and a directional receive antenna. The transmitter emits a high power illuminating signal at a receive frequency of a target RF receiver to be detected. The high power illuminating signal is sufficient to cause the target RF receiver to generate harmonic emissions. At least one detection system receiver is used for detecting at least one harmonic frequency emitted by the target RF receiver. The modulated signal source is operatively associated with the transmitter to modulate the illuminating signal and for use as a reference to the detection system receiver such that the turn around time of the harmonic frequency emitted by the target RF receiver can be measured. A directional receive antenna is operatively associated with the detection system receiver for determining the angle to the target RF receiver.

Existing non-linear junction detectors transmit a fixed frequency signal to a small area in close proximity and determine the presence of non-linear junctions by receiving the second and third harmonics. These are short range devices and the location of non-linear junctions is determined by proximity to the transmit/receive antenna. The present system transmits a high level signal within the threat receiver's input bandwidth which facilitates entry into the receiver to be detected and generation of harmonics far better than systems that use an arbitrary frequency signal. Inclusion of transmit signal modulation allows measurement of the signal turn around time and thus the distance to the receiver to be detected. Azimuth angle to the receiver to be detected may be determined using a directional antenna on the system receive side.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
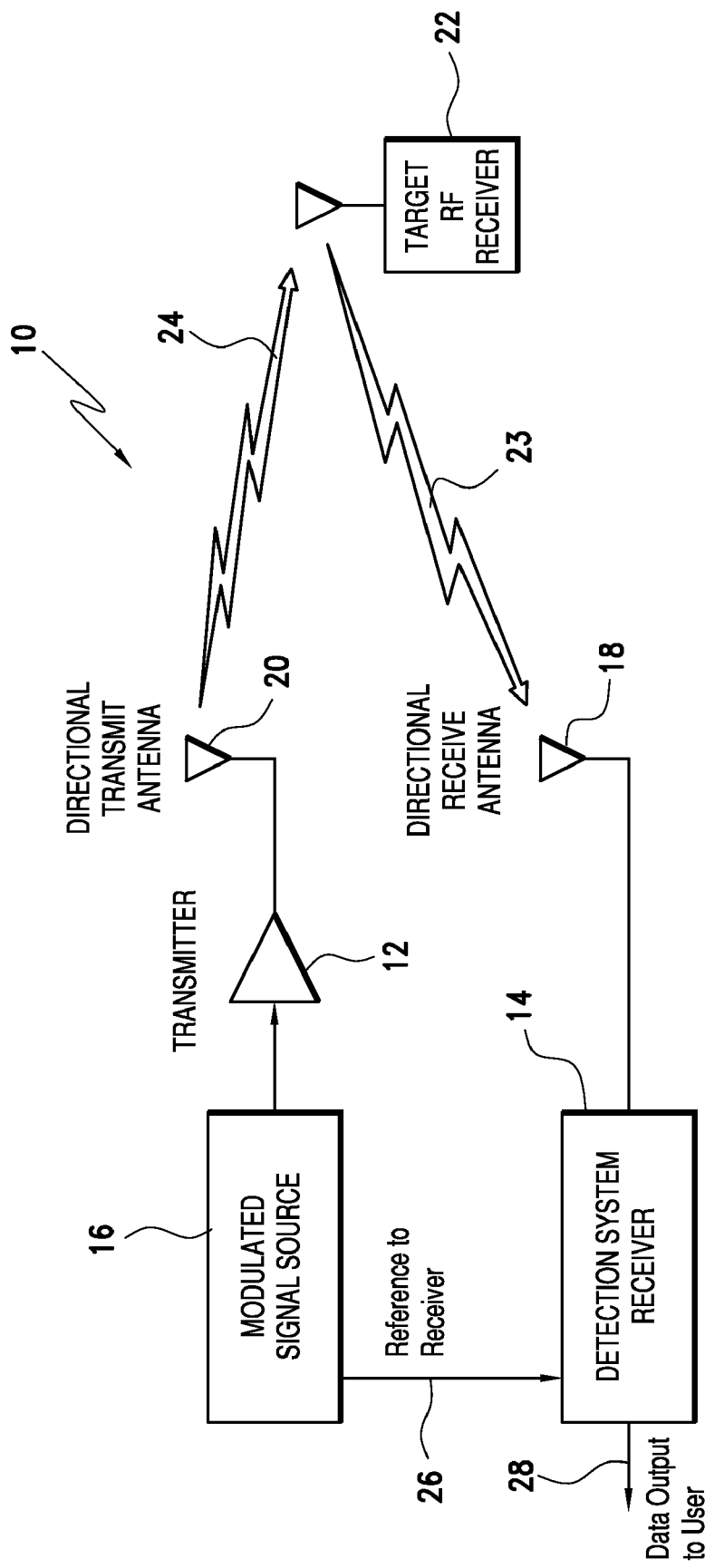
FIG. 1 is a system block diagram of the radio frequency (RF) receiver detection and locating system of the present invention.

Referring now to the drawings and the characters of reference marked thereon, FIG. 1 illustrates the radio frequency (RF) receiver detection and locating system, designated generally as 10. The RF receiver detection and locating system 10 includes a transmitter 12, at least one detection system receiver 14, a modulated signal source 16, and a directional receive antenna 18.

The transmitter 12 emits a high power illuminating signal, via an antenna 20, at a receive frequency of a target RF receiver 22 to be detected. As used herein, the term "high power" refers to that sufficient to cause the target RF receiver to generate harmonic emissions. A suitable transmitter may be, any of a broad class of commercially available power amplifiers designed to operate at the proper frequency and power out.

The target RF receiver 22 to be detected is likely to be a portable radio receiver, i.e. cell phone, portable radio, pager, FRS radio, garage door opener receiver, notebook computer (with WIFI receiver), or some other portable device that has a built in RF receiver. This may be used to detonate an improvised explosive device (IED).

The detection system receiver 14 detects a harmonic frequency emitted by the target RF receiver 22, as shown by numeral designation 23. If a single detection system receiver 14 is used it preferably detects the second or third harmonic, depending on the emission characteristics of the target receiver and other interference in the area. If multiple detection system receivers are used (as will be shown by reference to FIG. 2) then the detection system receivers preferably detect the second and third harmonics.

The modulated signal source 16 is operatively associated with the transmitter 12 to modulate the illuminating signal 24 and for use as a reference (as shown by numeral designation 26) to the detection system receiver 14 such that the turn around time of the harmonic frequency emitted by the target RF receiver 22 can be measured. Various types of modulated signal sources may be used such as amplitude modulated sources, phase modulated sources, and PN coded sources.

The directional receive antenna 18 is operatively associated with the detection system receiver for determining the angle to the target RF receiver 22. The angle is determined by sweeping the directional receive antenna and noting the angle where the strongest signal is obtained. The directional antenna can be any of a number of conventional designs such as a reflector dish type or a Yagi.

The data output 28 to a user from the detection system receiver 14 may be used for various applications including, for example, a display, alarm etc. There may be some very creative applications. For example, if used on a convoy route the data may be used to send out a robotic vehicle that scans the area to determine if there is a change in the received environmental signature as compared to a previous convoy and thus determine the presence of an IED.

Figure 2:
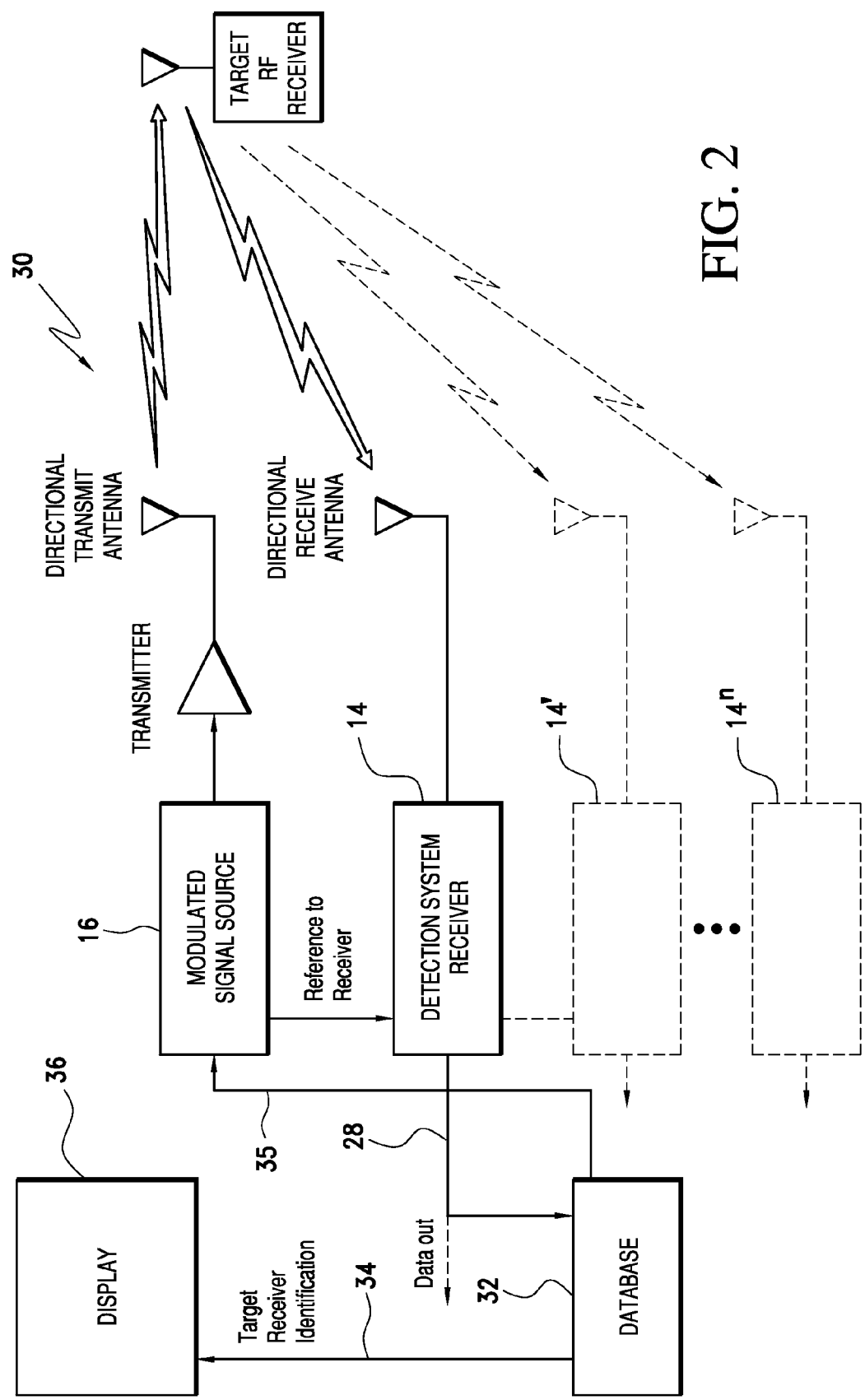
FIG. 2 is an overall system block diagram of a preferred embodiment of the radio frequency (RF) receiver detection and locating system of the present invention, shown implemented with a data base and display.

Referring now to FIG. 2, a radio frequency (RF) receiver detection and locating system is illustrated, designated generally as 30, that includes a target RF receiver database 32 for receiving the output 28 of the detection system receiver 14. Such a database 32 may include compiled information that characterizes potential target RF receivers thus providing the predetermined receive frequency, to the modulated signal source 16 as indicated by numeral designation 35. For example center frequency and passband characteristics of various target RF receivers may be stored to compare with actual signal returns.

The output 34 from the database 32 is provided to a suitable display 36. Displays may be handheld, PC laptop based, or embedded in a larger system.

FIG. 2 also illustrates that multiple detection system receivers 14, 14', . . . 14" may be utilized. These may detect second and/or third harmonics, as discussed above or possibly higher harmonics in special applications.

Figure 3:
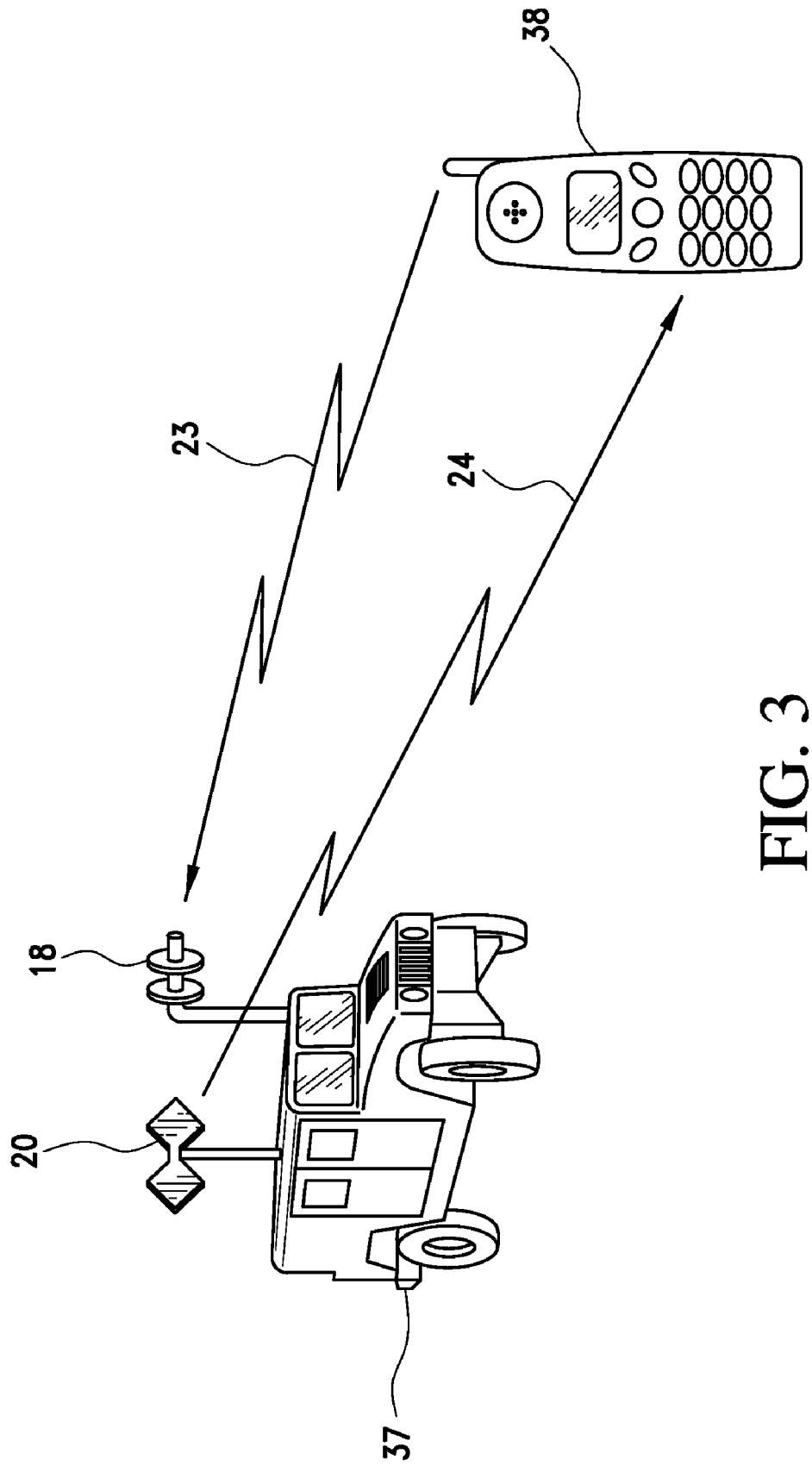
FIG. 3 is a schematic illustration of the RF receiver detection and locating system implemented as an IED detection and locating system.

Referring now to FIG. 3, application of the principles of the present invention as an IED detection system is illustrated. The directional transmit antenna 20 and directional receive antenna 18 are mounted on a truck 37 in a convoy. The transmit signal may be about 800 MHz. An IED detonator in the form of a cellular phone 38 may provide a 1600/2400 MHz harmonics signal. The 800 MHz signal is intended to be within the input passband response of the IED detonator. The 1600 and 2400 MHz harmonic return signals are generated when the 800 MHz signal saturates the IED detonator. Signal processing in the detection system receiver detects the turn around time of the transmit signal modulation to determine the distance to the IED. The angle to the IED is determined by sweeping the receive antenna as described above.

Other embodiments and configurations may be devised without departing from the spirit of the invention and the scope of the appended claims. While IED detection examples have been used, screening devices for airport security and homing devices for search and rescue missions are also potential applications of these inventive principles.

The invention claimed is:

1. A radio frequency (RF) receiver detection and locating system, comprising:
   a) a transmitter for emitting a high power illuminating signal at a predetermined receive frequency of a target RF receiver to be detected, said high power being sufficient to cause the target RF receiver to generate harmonic emissions;
   b) at least one detection system receiver configured to detect at least one harmonic frequency emitted by the target RF receiver;
   c) a modulated signal source operatively associated with said transmitter to modulate said illuminating signal and for use as a reference to said at least one detection system receiver such that the turn around time of said at least one harmonic frequency emitted by the target RF receiver can be measured;
   d) a directional receive antenna operatively associated with said at least one detection system receiver for determining the angle to said target RF receiver; and,
   e) a target RF receiver database for receiving an output of said at least one detection system receiver, said target RF receiver database including compiled information that characterizes potential target RF receivers, thus providing said predetermined receive frequency,
   wherein said at least one detection system receiver receives data to determine if there is a change in the environmental signature of an area for determining the presence of a target RF receiver by comparing the received data to data received in a previous scan of said area.

2. The RF receiver detection and locating system of claim 1, wherein said at least one detection system receiver comprises a single detection system receiver.

3. The RF receiver detection and locating system of claim 1, wherein said at least one detection system receiver comprises a plurality of detection system receivers.

4. The RF receiver detection and locating system of claim 1, wherein said target RF receiver comprises an improvised explosive device (IED).

5. The RF receiver detection and locating system of claim 1, wherein said target RF receiver comprises a portable radio receiver.

6. The RF receiver detection and locating system of claim 1, further comprising a transmit antenna operatively connected to said transmitter.

7. The RF receiver detection and locating system of claim 1, further comprising a directional transmit antenna operatively connected to said transmitter.

8. A method for detecting and locating a target RF receiver, comprising the steps of:
 a) emitting a high power illuminating signal at a predetermined receive frequency of a target RF receiver to be detected, said high power being sufficient to cause the target RF receiver to generate harmonic emissions;
 b) detecting at least one harmonic frequency emitted by the target RF receiver utilizing at least one detection system receiver;
 c) modulating said illuminating signal and providing a reference to said at least one detection system receiver such that the turn around time of said at least one harmonic frequency emitted by the target RF receiver can be measured;
 d) determining the angle to said target RF receiver utilizing a directional receive antenna; and,
 e) utilizing a target RF receiver database for receiving an output of said at least one detection system receiver, said target RF receiver database including compiled information that characterizes potential target RF receivers, thus providing said predetermined receive frequency,
 wherein said step of detecting at least one harmonic frequency emitted by the target RF receiver comprises receiving data to determine if there is a change in the environmental signature of an area for determining the presence of a target RF receiver by comparing the received data to data received in a previous scan of said area.

9. The method of claim 8, wherein said step of detecting at least one harmonic frequency emitted by the target RF receiver comprises determining the presence and position of an IED.

10. An improvised explosive device (IED) detection and locating system, comprising:
 a) a transmitter for emitting a high power illuminating signal at a predetermined receive frequency of a target IED to be detected, said high power being sufficient to cause the target IED to generate harmonic emissions;
 b) at least one detection system receiver configured to detect at least one harmonic frequency emitted by the target IED;
 c) a modulated signal source operatively associated with said transmitter to modulate said illuminating signal and for use as a reference to said at least one detection system receiver such that the turn around time of said at least one harmonic frequency emitted by the target IED can be measured;
 d) a directional receive antenna operatively associated with said at least one IED for determining the angle to said IED; and,
 e) a target IED database for receiving an output of said at least one detection system receiver, said target IED database including compiled information that characterizes potential target IED's, thus providing said predetermined receive frequency,
 wherein said at least one detection system receiver receives data to determine if there is a change in the environmental signature of an area for determining the presence of an IED by comparing the received data to data received in a previous scan of said area.

11. The improvised explosive device (IED) detection system of claim 10, wherein said at least one detection system receiver comprises a single detection system receiver.

12. The improvised explosive device (IED) detection system of claim 10, wherein said at least one detection system receiver comprises a plurality of detection system receivers.

13. The improvised explosive device (IED) detection system of claim 10, wherein said target IED comprises a portable radio receiver.

14. The RF receiver detection and locating system of claim 10, further comprising a transmit antenna operatively connected to said transmitter.

15. The RF receiver detection and locating system of claim 10, further comprising a directional transmit antenna operatively connected to said transmitter.

* * * * *